Patented Sept. 29, 1953

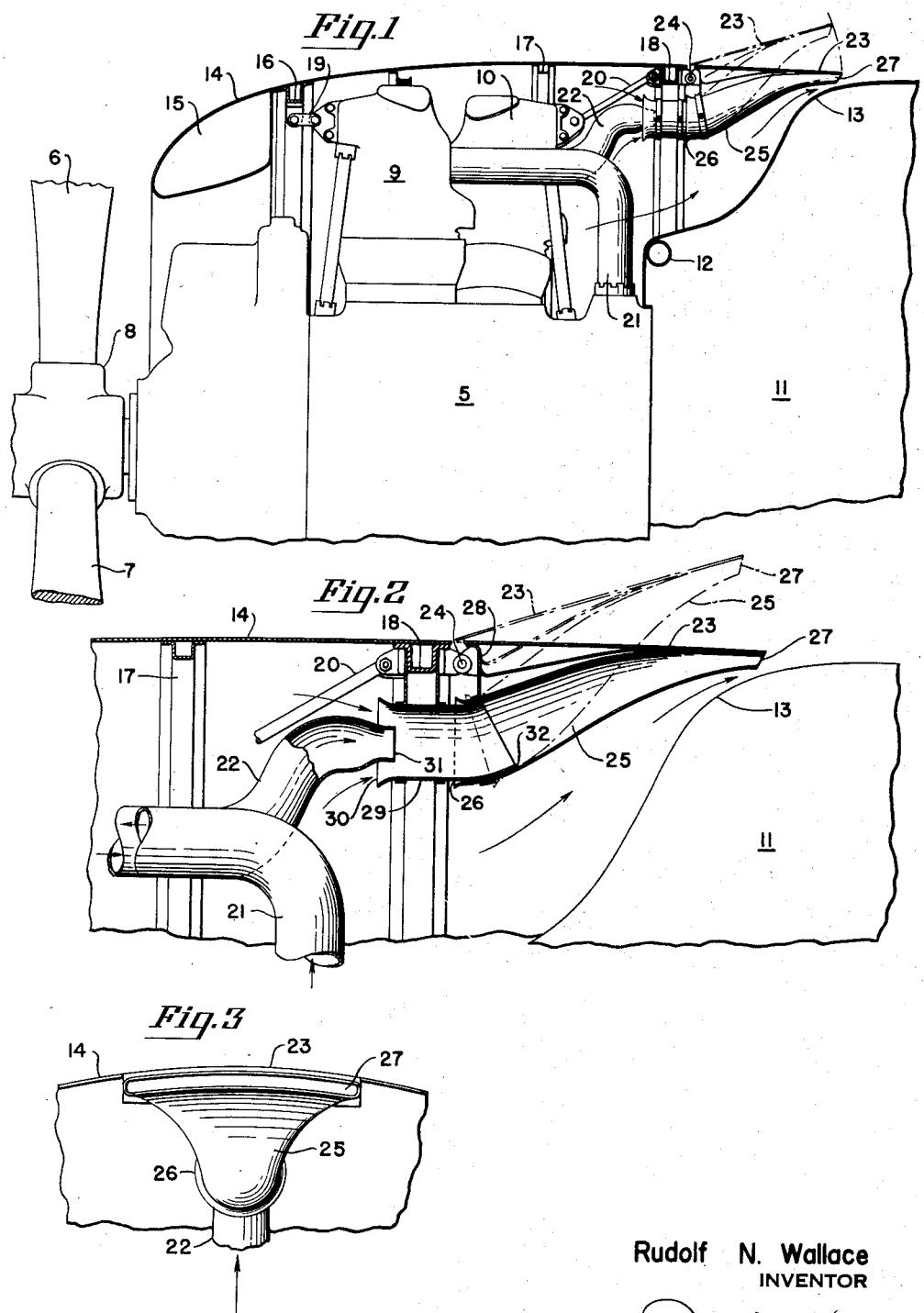

2,653,585

UNITED STATES PATENT OFFICE 2,653,585

ENGINE COOLING AND EXHAUST ARRANGEMENT

Rudolf N. Wallace, Glastonbury, Conn., assignor to United Aircraft Corporation, East Hartford, Conn., a corporation of Delaware Application December 22, 1949, Serial No. 134,371

12 Claims. (Cl. 123—41.59)

The present invention relates generally to engine cooling and more particularly to improvements in engine cowling and ducting for engine exhaust and cooling air flow.

Air-cooled engine installations, particularly those used for the propulsion of aircraft, require adequate means of controlling the flow of air through the engine and within the cowl or nacelle in order to cool the engine efficiently under different operating conditions. Such cooling air flow control is commonly obtained by means of hinged cowl flaps which serve to vary the area of the exit opening or throat adjacent the trailing edge of the cowl through which the air is discharged from the engine cooling system. These cowl flaps usually project into the airstream passing over the exterior of the cowl and when their displacement or projection into the airstream exceeds a certain angle, the flaps develop what is generally known as a "stalled" condition and create excessive drag or resistance. This drag is believed to be caused by the air which is deflected by the front or outer surface of the flap and which cannot flow smoothly past the trailing edge of the flap but breaks away abruptly and becomes highly turbulent.

The necessity of exhausting the engine gases into the airstream has also presented numerous problems. Similar difficulties also originate in the disturbance to the air flow externally of the cowl where the exhaust gases emerge and frequently cause turbulence which contributes toward increased drag of the power plant. The high temperatures of these exhaust gases also have deleterious effects upon the manifolds and tail pipes through which they are conducted and cause rupture and shortened life of this equipment. The high temperature of these exhaust gases also presents a fire hazard under certain conditions and is objectionable in certain types of aircraft in which it is found necessary to apply flame damping or other suppression or silencing means.

All of these objections and difficulties have been overcome by the present invention which relates essentially to a combined hollow cowl flap and exhaust gas ejector. This improvement comprises an arrangement wherein the exhaust gases are discharged from a nozzle into a bell-mouthed opening of a tubular duct element or conduit wherein the gases mix with the cooling air which has just passed over the engine. The tubular element preferably is connected by a flexible joint with a hollow cowl flap segment which is adjustably mounted for varying the cooling air exit at the trailing edge of the cowl skirt and in effect forms an ejector pump to accelerate the internal cooling air which flows over the engine, as well as the airstream passing externally of the cowl or nacelle. The hollow cowl flap inlet is preferably circular in cross-section and it is flattened in its shape toward its trailing edge outlet portion at which it is relatively wide circumferentially of the cowl and shallow in depth or radial dimension.

It is, accordingly, a primary object of the present invention to prevent the adjustable cowl flaps on an aircraft power plant installation from "stalling" and creating excessive drag when projected into the airstream. It is a corollary object to provide improved means for introducing added energy to the engine cooling air flow system through a high velocity discharge of the exhaust gases at the trailing edge of the cowl flaps. It is a further object to provide cooperative means between the exhaust gas system of the engine and its cooling air system to improve the flow of engine cooling air within the cowl as well as the external flow about the cowl by a dual or cascaded ejector effect. It is a further object to provide means for obtaining these and other results while at the same time improving the exhaust flame suppression and silencing of the exhaust noises; and by means of an improved arrangement of the ducted flap and exhaust nozzle to obtain augmentation of the cooling air flow thus improving the drag and cooling characteristics of the power plant cooling system.

Other objects and advantages of the present invention will occur to those skilled in the art after reading the present description taken in conjunction with the accompanying drawings forming a part hereof in which:

Fig. 1 is a longitudinal cross-sectional view of an air cooled power plant installation to which a form of the present invention has been applied;

Fig. 2 is an enlarged view of the same showing a cross-section of the combined cowl flap and exhaust gas ejector; and Fig. 3 is a transverse elevational view of the same looking forwardly.

Referring to the drawings, the numeral 5 designates the engine or power plant, on the forwardly extending crank-shaft of which is mounted a tractor propeller 6 having a plurality of blades 7 supported from the engine crank-shaft by a hub structure 8. The engine 5, of the air-cooled type, may be provided with a front row of radially disposed cylinders 9 and a rear row of similar cylinders 10 disposed in a staggered relationship with respect to the front row of cylinders. For illustrative purposes the numeral 11 designates the fuselage or supporting body of an aircraft, from the structural framework of which there is formed the engine mount 12 from which the engine 5 is suitably supported. The forward portion of the skin of the fuselage 11 is contoured at its shoulder portion 13 to form one side of the cooling air exit or gill, forwardly of which there extends a cowl or nacelle 14 of an annular shape to enclose the rows of cylinders 9 and 10 of the power plant 5. The cowl 14 is preferably provided with an inturned leading edge or nose portion 15 of an optimum shape to provide a rammed air intake for the cooling air passing within the cowl over the engine cylinders and dividing this air flow from that which is caused to flow externally of the cowl with a minimum of drag or resistance.

The cowl 15 is preferably supported from the engine 5 by means of the transverse former rings 16, 17 and 18 which may be in the form of hat-shaped channels with their flanges attached to the cowl inner surface. The forward ring 16 may be supported from the front row engine cylinders 9 by means of the supports 19, and the rearmost cowl ring 18 may be supported from the aft row of cylinders 10 by means of the bracket support 20. Each cylinder of the engine, or each group of cylinders, may be provided with an inlet duct or manifold 21 and the cylinders are provided with exhaust conduits or ducts 22. Cowl flaps 23 are hingedly supported just aft of the rear cowl former ring 18 at the pivotal connection 24. These cowl flaps extend longitudinally from the trailing edge of the fixed portion of the cowl or nacelle 14 in the region of the ring 18 and extend aft toward the fuselage 11 in the region of the contoured shoulder portion 13 thereof. It will be understood that the hinged cowl flaps 23 are arcuately formed in a circumferential direction as shown in the transverse view of Fig. 3, and that these cowl flaps 23 may be adjusted for displacement, either manually or automatically, into the airstream as indicated by the construction lines of Figs. 1 and 2. The movable cowl flap 23 has fixedly attached thereto the tubular ejector portion 25 having a duct entrance of circular cross-section at 26 and an exit portion of relatively flattened circumferentially arcuate shape 27. The cowl flap portion 23 which forms a streamlined continuation of the cowl exterior 14 is interconnected with and serves to space the inlet of the ejector duct 26 such that it is in alignment with the constricted rearwardly directed nozzle 31 of the exhaust conduit or duct 32.

Accordingly, both the cooling air and exhaust gas are discharged through the flap exit 27 which has a further ejector effect in accelerating the flow of the remainder of the engine cooling air through the cowl exit between the hollow flap 25 and the fuselage portion 13. Consequently, there is also a further mixing of the engine cooling air and exhaust gas at the trailing edge 27 of the combined hollow flap 25 and this additional or secondary mixing insures complete flame suppression or damping of the exhaust gases and an appreciable silencing effect upon the noise thereof. Due also to this accelerated flow through the cowl flap nozzle 27, which provides a second stage of the dual or cascaded ejector effect, the external flow over the cowl as it passes along the exterior of the cowl flap 23 is appreciably accelerated such that it flows smoothly past the cowl trailing edge without breaking away and causing turbulence and "stall" as heretofore with their undesirable effects upon the drag of the complete installation.

The tubular element 29 is interposed between the inlet 26 of the ejector duct 25 and the nozzle 31 of the exhaust duct 22, being supported internally of the cowl former ring 18. The inlet of the tubular element 29 is suitably bell-mouthed as at 30 to provide an effective ejector in conjunction with the nozzle 31 such that cooling air after having passed over the engine cylinders will be educted or drawn into the bell-mouthed portion of the tubular element 29 as indicated by the arrows in Fig. 2. The aft portion of the tubular element 29 is suitably curved to form an elbow exit portion 32 of circular cross-section to slidingly fit within the inlet 26 of the duct 25 to thereby form a flexible joint to permit relative rotation as the combined cowl flap and ejector duct 23—25 is adjusted about its hinge pivot mounting 24. The flap 23 and the duct 25 are rigidly interconnected by the stiffener structure 28. The exit portion of the tubular element 29 and the inlet portion 26 of the duct 25 forms a slip joint or ball-and-socket arrangement between the duct elements 29 and 25.

Accordingly, as the exhaust gases are ejected from the constricted nozzle 31 of the exhaust duct 22 into the bell-mouth opening 30 of the tube or duct 29, they serve to draw a portion of the cooling air passing through the cowl into the bell-mouth inlet 30 and are mixed within the tube 29 and the hollow flap 25, which are interconnected by the telescoping joint 32 permitting the flap angle to be varied during operation of the engine and under different flight conditions. It will be noted that the passage, in the flap 25 through which the exhaust gas and cooling air mixture passes, flares out from a relatively round section at its inlet 26 in the region of the telescoping joint 32 to a narrow slot extending across the full width of the flap at its trailing edge as indicated at 27.

While the annular fairing 14 surrounding the engine or power plant 5 has been referred to as a cowl at the forward edge of a fuselage such as 11, it will also be understood that the present invention is equally applicable to wing nacelles housing power plants of the air cooled and similar types. It will be understood that the present improvement is also applicable to power plants housed within cowls or nacelles, which power plants may be provided with pusher propellers, or in fact in installations in which a propeller is not mounted at either end of the cowl or nacelle. The relative size and shape of the various ducts and openings can obviously be varied as necessary to give the desired results and where conditions might make it desirable to do so, the flap can also be connected directly to the exhaust duct through a suitable flexible joint in such manner that only the exhaust gases discharge through the hollow flap 25 to thereby provide a single ejector effect at the cowl gill.

Other forms and modifications of the present invention which may occur to those skilled in the art after reading the foregoing description are intended to come within the scope and spirit of the present invention as more particularly set forth in the appended claims.

I claim:

1. In an aircraft power plant, an air cooled engine, a cowl for said engine, said cowl forming an annular cooling air exit, an exhaust gas conduit connected to said engine, a hollow cowl flap hingedly mounted upon said cowl at a forward edge of said cowl exit for controlling the flow of cooling air through said cowl and said cowl exit, said cowl flap having a bell-mouthed entrance portion cooperating with said exhaust gas conduit to conduct exhaust gases and a flattened exit portion in communication with each other through said hollow portion of said flap from said exhaust gas conduit through said hollow cowl flap to the external atmosphere at said cowl exit while simultaneously educting engine cooling air both into and through said hollow cowl flap nad through said cowl exit externally of said hollow cowl flap.

2. An aircraft power plant installation comprising an air cooled engine, a plurality of cylinders carried by said engine, a cowl surrounding said engine having an air inlet and an air exit portion, exhaust gas conduits from said cylinders, and hollow flap means pivotally mounted upon said cowl for the control of said exit portion, said hollow flap means having bell-mouthed entrance means in communication with said exhaust gas conduits arranged for conducting exhaust gas from said conduits to the airstream through said exit portion while simultaneously educting cooling air from within said cowl into said bell-mouthed entrance means with said exhaust gas.

3. In an aircraft power plant installation, an air cooled engine, a cowl for said engine, said cowl forming a cooling air entrance and a cooling air exit, an exhaust gas conduit extending from said engine toward said cooling air exit, said exhaust gas conduit having a reduced cross-sectional outlet, exit controlling means including a hollow cowl flap pivotally mounted upon said cowl adjacent said cooling air exit, said hollow cowl flap having a bell-mouthed entrance and a flat arcuate exit portion in communication with each other through said hollow portion of said flap, the said exhaust gas conduit outlet being in alignment with and in spaced relationship with the bell-mouthed entrance of said hollow cowl flap for conducting said exhaust gases from said exhaust gas conduit through said hollow cowl flap and said flap exit portion while simultaneously educting cooling air into said hollow cowl flap for admixture with said exhaust gas.

4. In an aircraft power plant installation, an air cooled engine, a cowl for said engine, said cowl forming a cooling air exit in the region of its trailing portion, an exhaust gas conduit from said engine terminating in a nozzle outlet forwardly spaced from said cooling air exit and a bell-mouthed duct member hingedly mounted upon said cowl rearwardly spaced from said exhaust gas nozzle arranged to form therewith an ejector for educting a portion of said cooling air with said exhaust gas through said duct member and said cowl exit, said duct member having a fairing skirt portion fixedly attached thereto movable upon said hinge mounting for the control of said cooling air exit of said cowl.

5. In an aircraft power plant installation, an air cooled engine, a cowl for said engine, said cowl forming a cooling air exit in the region of its trailing portion, an exhaust gas conduit extending rearwardly from said engine and within said cowl, a duct member having its inlet rearwardly spaced from said exhaust conduit and having its outlet at said cooling air exit, said exhaust gas conduit and said duct member inlet cooperating to form an initial ejector for drawing a portion of the cooling air through said duct member, and said duct member having an arcuately flattened outlet cooperating with said cooling air exit in drawing the remaining cooling air through said cowl exit, said duct member hingedly mounted upon said cowl to function simultaneously as a cowl exit flap.

6. In an aircraft power plant installation including a supporting body, an engine having a plurality of air cooled cylinders, a cowl surrounding said cylinders having open entrance and exit portions, and an exhaust duct from said cylinders directing exhaust gases through said cowl exit between said cowl and said supporting body; the improvement comprising a hollow cowl flap pivotally supported upon said cowl having a circular entrance portion in communication with one of said exhaust conduits and having an arcuately flattened exit portion arranged to provide an ejector effect upon cooling air passing through said cowl and over said engine.

7. In aircraft, a supporting body, an air cooled engine supported upon said body, a cowl for said engine arranged to cause cooling air to pass internally of said cowl for cooling said engine and to cause air to flow exteriorly of said cowl and said body, said cowl and said body being longitudinally spaced to provide a cooling air exit, an exhaust gas conduit associated with said engine having a reduced diameter nozzle portion, a hollow cowl flap pivotally mounted for controlling said cowl exit and ejector duct means including a bell-mouthed entrance portion associated with said hollow cowl flap in communication with said engine exhaust conduit for accelerating said cooling air both through said hollow cowl flap and through said cowl exit to reduce turbulence creating tendencies in said external air passing over said cowl flap.

8. In a power plant installation supported from an aircraft body, an engine having a plurality of air cooled cylinders, a cowl having cooling air entrance and exit portions for directing cooling air over said engine cylinders, an exhaust gas conduit in communication with one or more of said cylinders having a nozzle portion rearwardly directed toward said cooling air exit of said cowl, and a hollow cowl flap pivotally supported from said cowl having a bell-mouthed entrance portion arranged to cooperate with said exhaust gas nozzle to educt cooling air through said cowl flap and accelerate the flow through said air exit portion of said cowl by the ejector effect of said exhaust gas and cooling air mixture ejected from the trailing exit of said hollow cowl flap.

9. In a power plant installation, an air cooled engine, a cowl surrounding said engine having an inlet portion for engine cooling air and an exit portion adjacent its trailing edge for said cooling air, an exhaust duct for conducting gases from said engine toward said cooling air exit portion, and a unitary cowl flap and ejector duct pivotally mounted for adjustment as a unit into position for controlling the cooling air flow through said cowl exit, the inlet of said ejector duct cooperating in a spaced relationship with the outlet of said exhaust conduit to provide an initial ejector effect for educting a portion of the cooling air flow through said cowl flap ejector duct and accelerating the flow of the remainder of the cooling air through said cowl exit portion.

10. In a power plant installation for an air cooled aircraft engine including a cowl for said engine, said cowl having an inlet portion for dividing the air flow externally of said cowl and internally of said cowl for cooling said engine, a cooling air exit formed in the region of the trailing edge of said cowl, a cowl flap pivotally mounted upon said cowl for controlling the cooling air flow through said cowl exit and tubular means having an arcuately flattened exit portion fixedly associated with said cowl flap and having an entrance portion fixedly associated with said cowl supporting structure in communication with the exhaust gases of said engine for accelerating the cooling air flow through said cowl exit for preventing the stall of said cowl flap when said flap is deflected into the airstream surrounding said cowl.

11. In an aircraft power plant installation including a supporting body, an engine having a plurality of air cooled cylinders, a cowl surrounding said cylinders having entrance and exit portions, and an exhaust duct from said cylinders directing gases rearwardly toward said cowl exit portion between said cowl and said supporting body; the improvement comprising a tubular cowl flap pivotally mounted upon said cowl supporting structure, said cowl flap having a tubular entrance portion of larger cross-section and in communication with said exhaust duct to cooperatively form therewith an ejector for educting a portion of the cooling air through said tubular cowl flap with said engine exhaust, said cowl flap having an arcuately flattened exit portion arranged to provide a further ejector effect upon the remaining cooling air passing through said cowl exit.

12. In an aircraft power plant installation including a supporting body, an engine having a plurality of air cooled cylinders, a cowl surrounding said cylinders having entrance and exit portions, and an exhaust duct from said cylinders directing gases rearwardly toward said cowl exit portion between said cowl and said supporting body; the improvement comprising a tubular cowl flap pivotally mounted upon said cowl supporting structure, said cowl flap having a tubular entrance portion of larger cross-section and in communication with said exhaust duct to cooperatively form therewith an ejector or educting a portion of the cooling air through said tubular cowl flap with said engine exhaust, said cowl flap having an arcuately flattened exit portion arranged to provide a further ejector effect upon the remaining cooling air passing through said cowl exit, and a slip joint cooperatively formed by said cowl flap portions intermediate said entrance and said flattened exit portion to maintain the relationship of said entrance portion with said exhaust duct while permitting hinged movements of said cowl flap.

RUDOLF N. WALLACE.

References Cited in the file of this patent

UNITED STATES PATENTS

| Number | Name | Date |
|---|---|---|
| 2,231,239 | Wright et al. | Feb. 11, 1941 |
| 2,244,594 | Amiot | June 3, 1941 |
| 2,377,708 | Mercier | June 5, 1945 |
| 2,410,856 | Koppen | Nov. 12, 1946 |
| 2,426,872 | Willgoos | Sept. 2, 1947 |
| 2,488,174 | Clegerin | Nov. 15, 1949 |

FOREIGN PATENTS

| Number | Country | Date |
|---|---|---|
| 40,112 | Sweden | Feb. 2, 1916 |
| 365,482 | Germany | Dec. 16, 1922 |

OTHER REFERENCES

Ser. No. 296,469, Schnetzer (A. P. C.), published May 11, 1943.